US012565410B2

(12) United States Patent
Kakita et al.

(10) Patent No.: US 12,565,410 B2
(45) Date of Patent: Mar. 3, 2026

(54) SIDE SHIFT CONTROL DEVICE FOR FORKLIFT TRUCK

(71) Applicant: KABUSHIKI KAISHA TOYOTA JIDOSHOKKI, Kariya (JP)

(72) Inventors: Yoshiki Kakita, Aichi-ken (JP); Tatsuya Mita, Aichi-ken (JP); Shunsuke Okumura, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 159 days.

(21) Appl. No.: 18/098,252

(22) Filed: Jan. 18, 2023

(65) Prior Publication Data

US 2023/0227298 A1 Jul. 20, 2023

(30) Foreign Application Priority Data

Jan. 18, 2022 (JP) ................................. 2022-005528

(51) Int. Cl.
*B66F 9/075* (2006.01)
*B66F 9/14* (2006.01)

(52) U.S. Cl.
CPC ............ *B66F 9/0755* (2013.01); *B66F 9/146* (2013.01)

(58) Field of Classification Search
CPC ........... B66F 9/24; B66F 9/146; B66F 9/0755
See application file for complete search history.

(56) References Cited

U.S. PATENT DOCUMENTS

| | | | | | |
|---|---|---|---|---|---|
| 4,957,408 | A * | 9/1990 | Ohkura | B66F 9/20 414/673 |
| 2020/0377350 | A1 | 12/2020 | Nonogaki et al. | |

FOREIGN PATENT DOCUMENTS

| | | | | |
|---|---|---|---|---|
| JP | 02175599 | A | * | 7/1990 |
| JP | 5-186200 | A | | 7/1993 |
| JP | 08026691 | A | * | 1/1996 |
| JP | 2020-40790 | A | | 3/2020 |
| JP | 2020-138819 | A | | 9/2020 |
| JP | 2021-143039 | A | | 9/2021 |
| WO | WO-2022130847 | A1 | * | 6/2022 |

OTHER PUBLICATIONS

Machine translation of JP 08-026691.*
German Office Action dated Aug. 22, 2024 in Application No. 102023100861.7.
Communication dated Jan. 28, 2025 in Japanese Application No. 2022-005528.

* cited by examiner

*Primary Examiner* — Diem M Tran
(74) *Attorney, Agent, or Firm* — Sughrue Mion, PLLC

(57) ABSTRACT

A side shift control device for a forklift truck, which is configured to cause a side shift unit to move a pair of forks holding a pallet in a right-left direction so that the pallet comes in contact with an object when the pallet is placed beside the object, includes: a side shift control unit configured to control the side shift unit so that the pair of forks begin to move toward the object after the pair of forks are inserted into a pair of fork holes formed in the pallet; a detecting unit configured to detect a movement of the pallet with the forks inserted in the fork holes; and a determining unit configured to determine, based on the movement of the pallet detected by the detecting unit, whether the pallet is in contact with the object.

3 Claims, 10 Drawing Sheets

SIDE SHIFT CONTROL DEVICE FOR FORKLIFT TRUCK

CROSS-REFERENCE TO RELATED APPLICATION

This application claims priority to Japanese Patent Application No. 2022-005528 filed on Jan. 18, 2022, the entire disclosure of which is incorporated herein by reference.

The present disclosure relates to a side shift control device for a forklift truck.

BACKGROUND ART

Japanese Patent Application Publication No. 2021-143039 mentions a forklift truck including a side shift device. The side shift device mentioned in Japanese Patent Application Publication No. 2021-143039 includes a lift bracket elevated along a mast, a backrest which is provided on the lift bracket and to which forks are mounted, and a shifting mechanism configured to shift the forks in a vehicle width direction (a right-left direction).

When loading into a truck, the side shift device may place pallets on a loading platform of the truck such that the pallets are placed without a gap between the adjacent pallets, for example. If the forks are automatically side shifted with an excessive amount of side shift of the forks (travel amount) specified, an object, such as an adjacent pallet or a side wall of the loading platform may be pushed excessively. This may cause a damage to the pallets or a shifting of cargoes on the truck due to vibration of the truck.

The present disclosure, which has been made in light of the above-mentioned problem, is directed to providing a side shift control device for a forklift truck, the side shift control device being capable of placing a pallet beside an object without a gap between the pallet and the object while preventing the pallet from pushing the object excessively.

SUMMARY

In accordance with an aspect of the present disclosure, there is provided a side shift control device for a forklift truck that is configured to cause a side shift unit to move a pair of forks holding a pallet in a right-left direction so that the pallet comes in contact with an object when the pallet is placed beside the object and includes: a side shift control unit configured to control the side shift unit so that the pair of forks begin to move toward the object after the pair of forks are inserted into a pair of fork holes formed in the pallet; a detecting unit configured to detect a movement of the pallet with the forks inserted in the fork holes; and a determining unit configured to determine, based on the movement of the pallet detected by the detecting unit, whether the pallet is in contact with the object.

Other aspects and advantages of the disclosure will become apparent from the following description, taken in conjunction with the accompanying drawings, illustrating by way of example the principles of the disclosure.

BRIEF DESCRIPTION OF THE DRAWINGS

The present disclosure together with objects and advantages thereof, may best be understood by reference to the following description of the embodiments together with the accompanying drawings in which.

DETAILED DESCRIPTION OF EMBODIMENTS

Figure 1:
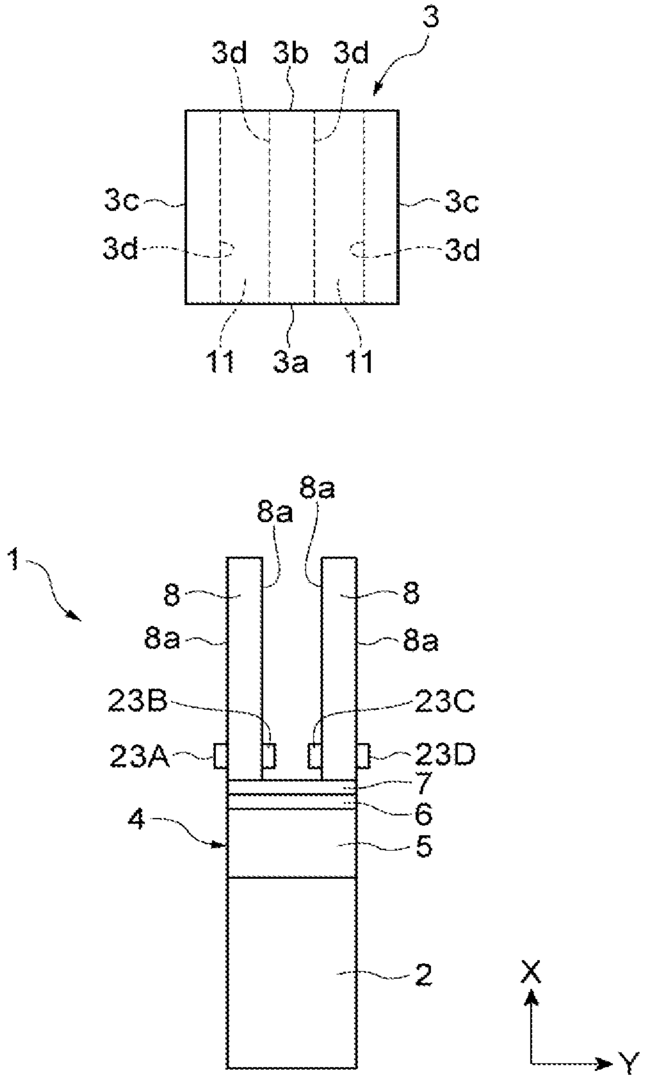
FIG. 1 is a schematic plane view of a forklift truck provided with a side shift control device according to embodiments of the present disclosure, illustrating the forklift truck with a pallet.

The following will describe embodiments of the present disclosure in detail with reference to the accompanying drawings. It is to be noted that, in the drawings, identical or equivalent elements are denoted by the same reference numerals and will not be further elaborated.

FIG. 1 is a schematic plane view of a forklift truck provided with a side shift control device according to embodiments of the present disclosure, illustrating the forklift truck with a pallet. As shown in FIG. 1, a forklift truck 1 includes a vehicle body 2, and a cargo handling device 4 disposed in front of the vehicle body 2 and configured to handle pallets 3. In the following description, X direction denotes the front-rear direction of the forklift truck 1, and Y direction denotes the right-left direction (the width direction) of the forklift truck 1.

The cargo handling device 4 includes a mast 5 mounted on the front end portion of the vehicle body 2, a pair of forks 8 mounted on the mast 5 via a lift bracket 6 and a load bracket 7 and configured to move up and down and hold the pallets 3, a lift cylinder 9 (see FIG. 2) configured to lift the forks 8, and a side shift cylinder 10 (see FIG. 2) configured to move the load bracket 7 relative to the lift bracket 6 in the right-left direction (Y direction) so as to move the forks 8 in the right-left direction. The cargo handling device 4 includes a tilt cylinder (not illustrated) configured to tilt the mast 5.

The pallets 3 are plastic or wooden flat pallets, for example. Each of the pallets 3 on which a cargo (not illustrated) is placed has a square or rectangle shape in a plane view. The pallet 3 has a front surface 3*a*, a rear surface 3*b*, and two side surfaces 3*c*. The front surface 3*a* faces the forklift truck 1 when the forklift truck 1 holds the pallet 3 with the forks 8.

The pallet 3 has a pair of fork holes 11 into which the pair of forks 8 are inserted. The fork holes 11 extend from the front surface 3*a* to the rear surface 3*b* of the pallet 3. Each fork hole 11 is formed of inner surfaces 3*d* of the pallet 3 disposed on the right side and the left side of the fork hole 11, and each of the inner surfaces 3*d* serves as the inner wall surface of the present disclosure.

The pallets 3 are placed on the loading platform of a truck (not illustrated) for cargo loading. The pallets 3 are arranged adjacent to each other without a gap between the side surfaces 3*c* of the pallets 3 adjacent in the right-left direction (see FIGS. 4A-4C).

Figure 2:
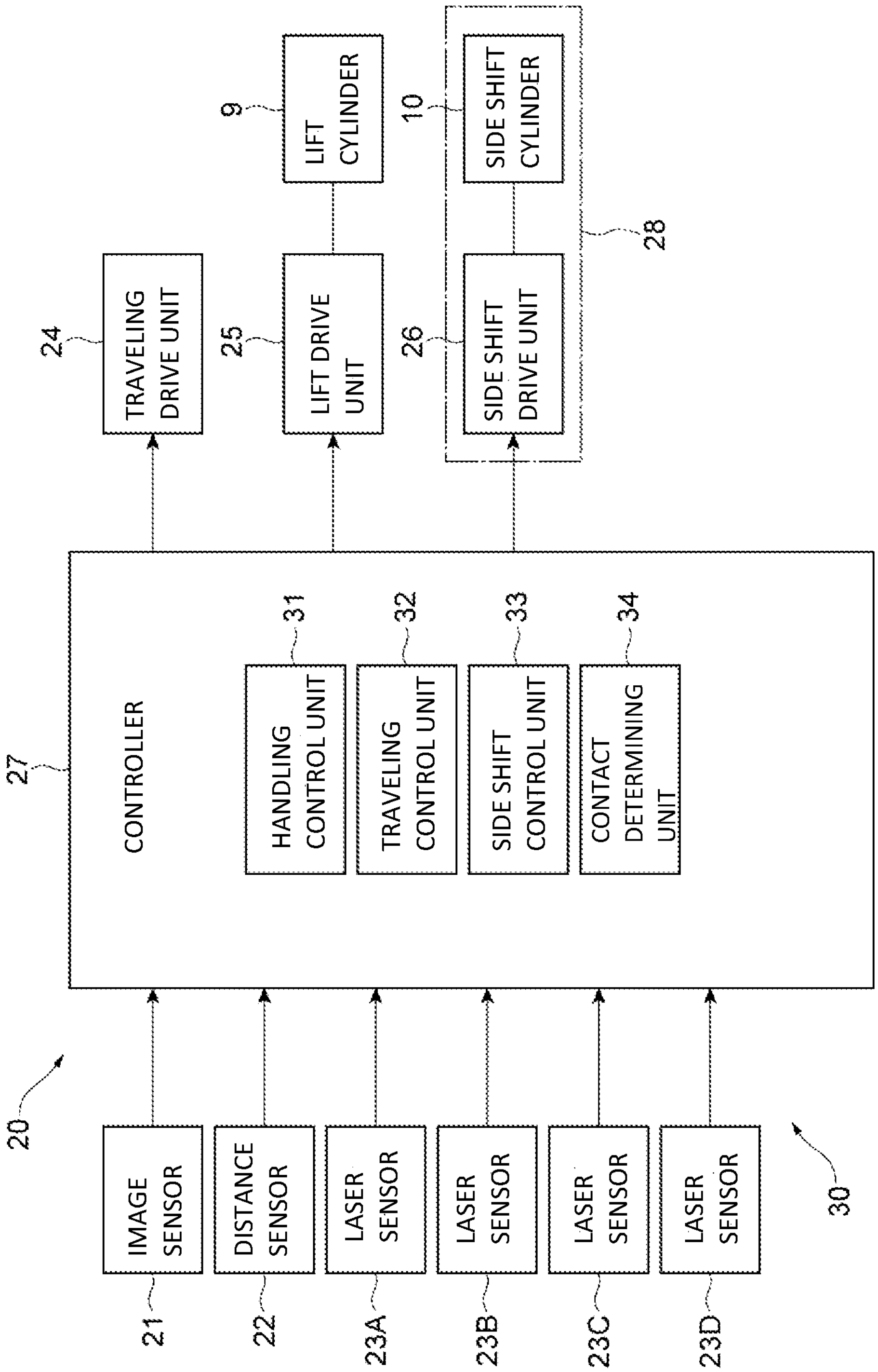
FIG. 2 is a schematic diagram of a loading control device provided with the side shift control device according to a first embodiment of the present disclosure.

FIG. 2 is a schematic diagram of a loading control device provided with the side shift control device according to a first embodiment of the present disclosure. As illustrated in FIG. 2, a loading control device 20 includes an image sensor 21, a distance sensor 22, four laser sensors 23A-23D, a traveling drive unit 24, a lift drive unit 25, a side shift drive unit 26, and a controller 27.

The loading control device 20 is configured to automatically load a cargo in a loading position on the loading platform of the truck. The loading position is located beside the pallet 3 already placed on the loading platform (i.e., an existing pallet 3A, which will be described later) or beside a wall of the loading platform. The pallet 3 already placed on the loading platform and the wall of the loading platform each serve as the object of the present disclosure.

The image sensor 21 is a camera that is configured to take a front view of the forklift truck 1 (i.e., view of the fork holes 11) to acquire image data. The image sensor 21 is mounted on the mast 5, for example.

The distance sensor 22 is configured to measure a distance from the forklift truck 1 to a target (i.e., the pallet 3) located in front of the forklift truck 1. The distance sensor 22 uses a method, such as light detection and ranging (LIDAR) for determining a distance to the target by irradiating the target with a 2D or 3D laser beam and receiving a reflection of the laser beam from the target. The distance sensor 22 is mounted on the mast 5, for example.

The laser sensors 23A-23D are fixed to the proximal end portions of the forks 8 as illustrated in FIG. 1. Specifically, the pair of forks 8 disposed in the front portion of the forklift truck 1 include the right fork 8 and the left fork 8 respectively located on the right side and the left side of the forklift truck 1. Each of the right fork 8 and the left fork 8 has side surfaces 8*a* on the both sides thereof in the right-left direction. The laser sensor 23A is fixed to the left side surface 8*a* (outer-side surface in the right-left direction) of the left fork 8 at the proximal portion of the left fork 8. The laser sensor 23B is fixed to the right side surface 8*a* (inner-side surface in the right-left direction) of the left fork 8 at the proximal portion of the left fork 8. The laser sensor 23C is fixed to the left side surface 8*a* (inner-side surface in the right-left direction) of the right fork 8 at the proximal portion of the right fork 8. The laser sensor 23D is fixed to the right side surface 8*a* (outer-side surface in the right-left direction) of the right fork 8 at the proximal portion of the right fork 8.

With the forks 8 inserted into the fork holes 11 of the target pallet 3, the laser sensors 23A-23D irradiate the pallet 3 with straight laser beams (1D) and detect reflections of the laser beams from the front surface 3*a* of the pallet 3. The laser sensors 23A-23D emit the laser beams in a direction in which the forks 8 extend (see FIGS. 4A-4C).

The laser sensors 23A-23D detect the reflected laser beams from the front surface 3*a* of the pallet 3 to sense a movement of the target pallet 3 with the forks 8 inserted in the fork holes 11 of the target pallet 3. Accordingly, the laser sensors 23A-23D cooperate to serve as the detecting unit of the present disclosure that is configured to detect a movement of the pallet 3 with the forks 8 inserted in the fork holes 11 of the target pallet 3.

The traveling drive unit 24 is configured to drive the forklift truck 1 to travel. The traveling drive unit 24 includes a traveling motor for causing the forklift truck 1 to travel and a steering motor for steering the forklift truck 1, which are not illustrated.

The lift drive unit 25 is configured to drive the lift cylinder 9 to elongate and contract. The lift drive unit 25 is an electromagnetic control valve disposed between a hydraulic pump and the lift cylinder 9 although this arrangement is not illustrated.

The side shift drive unit 26 is configured to drive the side shift cylinder 10 to elongate and contract. The side shift drive unit 26 is an electromagnetic control valve disposed between the hydraulic pump and the side shift cylinder 10 although this arrangement is not illustrated. The side shift drive unit 26 cooperates with the side shift cylinder 10 to form a side shift unit 28.

The controller 27 includes a central processing unit (CPU), a random access memory (RAM), a read-only memory (ROM), and input/output interfaces. The controller 27 includes a handling control unit 31, a traveling control unit 32, a side shift control unit 33, and a contact determining unit 34 (determining unit).

The handling control unit 31 is configured to control the lift drive unit 25 so that the forks 8 move up to hold the pallet 3 when the forks 8 are inserted into the fork holes 11 of the pallet 3.

The traveling control unit 32 is configured to control the traveling drive unit 24 so that the forklift truck 1 with the forks 8 holding the pallet 3 travels to the loading position.

The side shift control unit 33 is configured to control the side shift drive unit 26 so that the forks 8 begin to move toward the pallet 3 already placed on the loading platform when the forklift truck 1 arrives at the loading position. The pallet 3 already placed on the loading platform is referred to as the existing pallet 3A (see FIGS. 4A-4C).

The side shift control unit 33 is configured to control the side shift unit 28 so that the pair of forks 8 begin to move toward the existing pallet 3A after the pair of forks 8 are inserted into the pair of fork holes 11 of the pallet 3.

The contact determining unit 34 is configured to determine, based on the movement of the pallet 3 detected by the laser sensors 23A-23D, whether the pallet 3 held by the forks 8 is in contact with the existing pallet 3A.

The contact determining unit 34 is configured to judge, based on the detection data of the laser sensors 23A-23D, whether the pallet 3 held by the forks 8 has moved relative to the forks 8. When the contact determining unit 34 judges that the pallet 3 held by the forks 8 has moved relative to the forks 8, the contact determining unit 34 determines that the pallet 3 held by the forks 8 is in contact with the existing pallet 3A.

The laser sensors 23A-23D cooperate with the side shift control unit 33 and the contact determining unit 34 of the controller 27 to form the side shift control device 30 of the present embodiment. The side shift control device 30 is configured to cause the side shift unit 28 to move the forks 8 holding the pallet 3 in the right-left direction so that the pallet 3 held by the forks 8 comes in contact with the existing pallet 3A when the pallet 3 is placed beside the existing pallet 3A.

Figure 3:
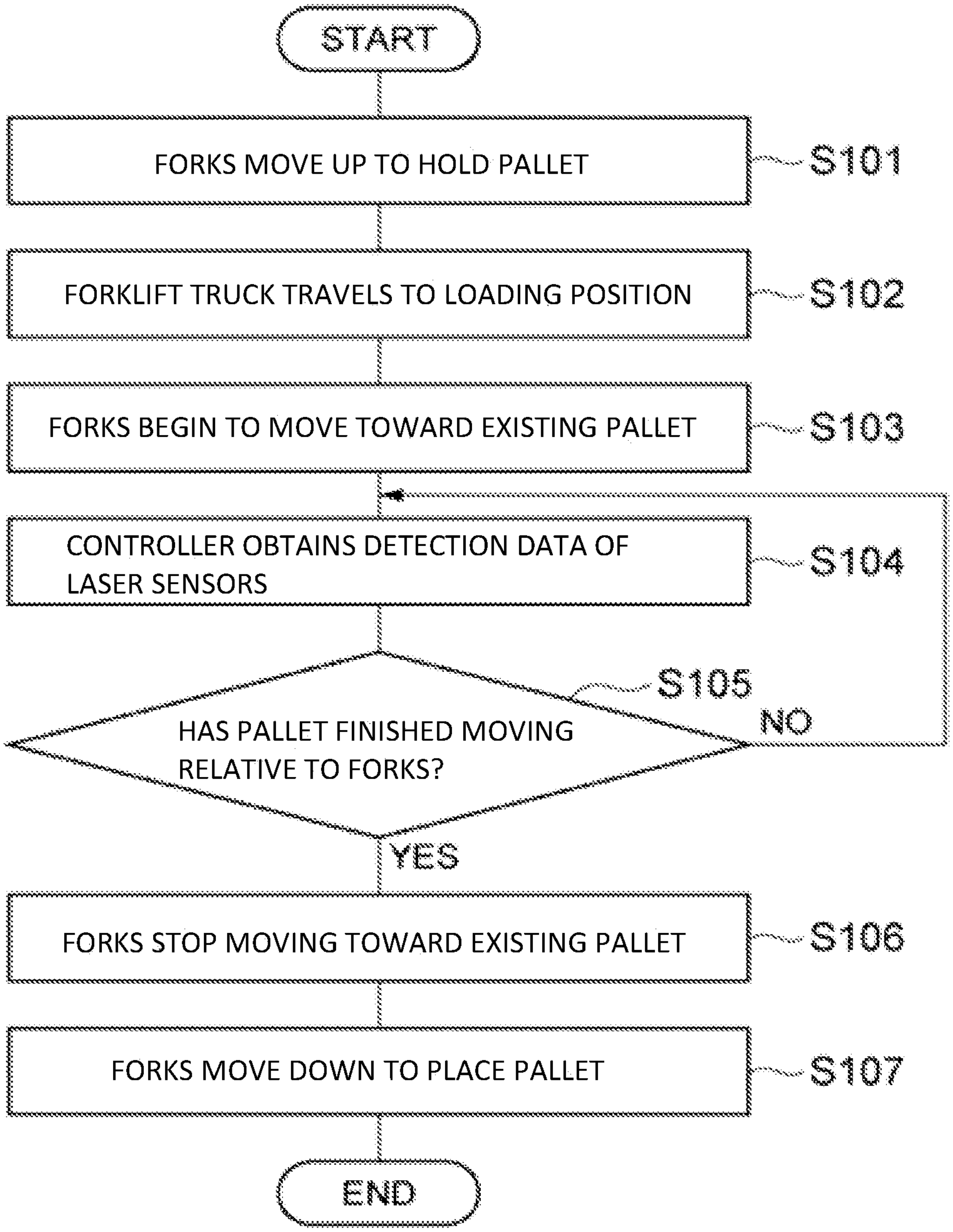
FIG. 3 is a flowchart of a control process performed by a controller illustrated in FIG. 2.

FIG. 3 is a flowchart of a control process performed by the controller 27. This control process is performed when the forks 8 are inserted into the fork holes 11 of the pallet 3. The insertion of the forks 8 into the fork holes 11 is judged, for example, based on the image data of the image sensor 21 or the measurement data of the distance sensor 22.

In FIG. 3, the controller 27 controls the lift drive unit 25 so that the forks 8 move up to hold the pallet 3 (step S101). Then, the controller 27 controls the traveling drive unit 24 so that the forklift truck 1 travels to the loading position (step S102).

Figure 4A:
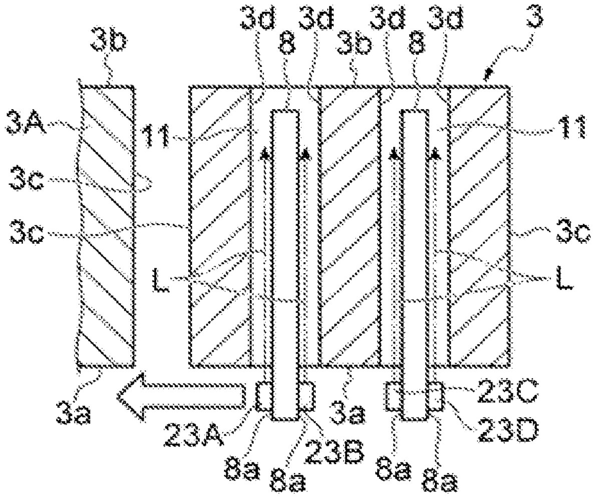
FIGS. 4A-4C are sectional views depicting a loading operation performed by the loading control device illustrated in FIG. 2.

The controller 27 then controls the side shift drive unit 26 so that the forks 8 begin to move toward the existing pallet 3A (step S103). The pallet 3 held by the forks 8 is moved toward the existing pallet 3A as illustrated in FIG. 4A.

Next, the controller 27 obtains the detection data of the laser sensors 23A-23D (step S104). The controller 27 then judges, based on the detection data of the laser sensors 23A-23D, whether the pallet 3 held by the forks 8 has finished moving relative to the forks 8 (step S105).

Figure 4B:
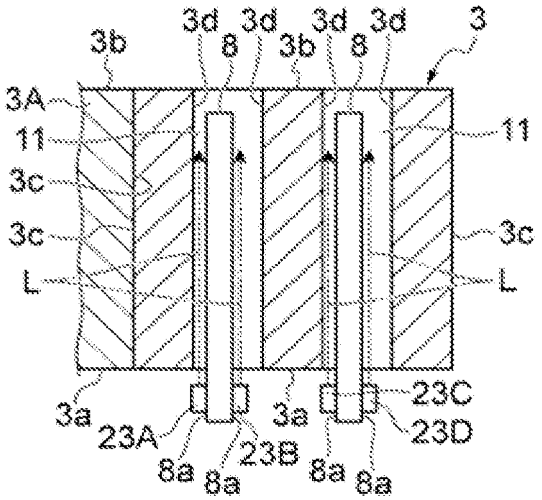

As illustrated in FIG. 4B, the pallet 3 held by the forks 8 is not moved any further toward the existing pallet 3A in a situation where the pallet 3 held by the forks 8 is in contact with the existing pallet 3A, but the forks 8 are still moved by the side shift unit 28 toward the existing pallet 3A. Accordingly, the pallet 3 moves relative to the forks 8 in the right-left direction.

However, as illustrated in FIG. 4B, if the pallet 3 moves relative to the forks 8 in the right-left direction in a situation where the pallet 3 held by the forks 8 is in contact with the existing pallet 3A, it is judged that the pallet 3 has not finished moving relative to the forks 8 when the laser sensors 23A-23D do not receive reflections of laser beams L although the laser sensors 23A-23D emit the laser beams L because the laser beams L emitted from the laser sensors 23A-23D are not reflected from the front surface 3*a* of the pallet 3.

Figure 4C:
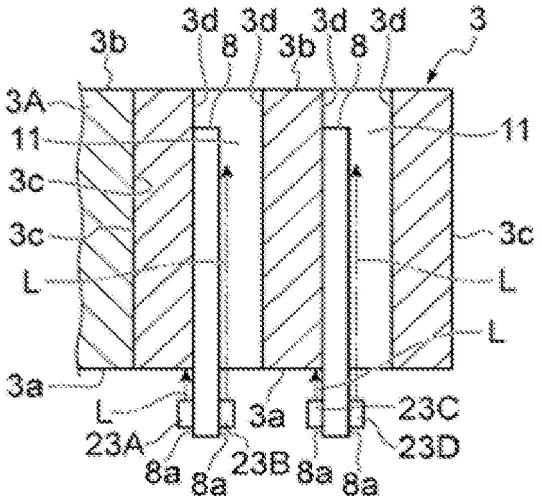

However, as illustrated in FIG. 4C, it is judged that the pallet 3 has finished moving relative to the forks 8 when the laser sensors 23A, 23C receive the reflections of the laser beams L from the front surface 3*a* of the pallet 3 and the laser sensors 23B, 23D do not receive the reflections of the laser beams L because the laser beams L emitted from the laser sensors 23B, 23D are not reflected by the front surface 3*a* of the pallet 3 although the laser sensors 23A-23D emit the laser beams L. It is also judged that the pallet 3 has finished moving relative to the forks 8 when the laser sensors 23B, 23D receive the reflections of the laser beams L from the front surface 3*a* of the pallet 3 and the laser sensors 23A, 23C do not receive the reflections of the laser beams L because the laser beams L emitted from the laser sensors 23A, 23C are not reflected by the front surface 3*a* of the pallet 3 although the laser sensors 23A-23D emit the laser beams L.

In this embodiment, although the laser sensors 23A-23D emit the laser beams L, the laser sensors 23A, 23C receive the reflections of the laser beams L from the front surface 3*a* of the pallet 3 and the laser sensors 23B, 23D do not receive the reflections of the laser beams L from the front surface 3*a* of the pallet 3 because the laser beams L emitted from the laser sensors 23B, 23D are not reflected by the front surface 3*a* of the pallet 3.

When the controller 27 judges that the pallet 3 held by the forks 8 has not finished moving relative to the forks 8, the controller 27 performs step S104 again. When the controller 27 judges that the pallet 3 held by the forks 8 has finished moving relative to the forks 8, the controller 27 controls the side shift drive unit 26 so that the forks 8 stop moving toward the existing pallet 3A (step S106).

The controller 27 controls the lift drive unit 25 so that the forks 8 move down to place the pallet 3 on the loading platform (step S107). Accordingly, loading of one pallet 3 is completed.

Step S101 and step S107 are performed by the handling control unit 31. Step S102 is performed by the traveling control unit 32. Step S103 and step S106 are performed by the side shift control unit 33. Step S104 and step S105 are performed by the contact determining unit 34.

In the loading control device 20, the forks 8 are inserted into the fork holes 11 of the pallet 3 as the forklift truck 1 moves forward, from a position in front of the pallet 3 placed at the picking position, toward the front surface 3*a* of the pallet 3. In this state, the lift cylinder 9 raises the forks 8 so that the forks 8 lift and hold the pallet 3.

The forklift truck 1 travels to the loading position of the loading platform of the truck. As illustrated in FIG. 4A, the existing pallet 3A is already on the loading platform of the truck. The loading position is on the right side of the existing pallet 3A on the loading platform. The forklift truck 1 is stopped at the loading position so that the pallet 3 held by the forks 8 is placed at a position away from the existing pallet 3A to the right by a predetermined distance.

Then, the side shift unit 28 moves the forks 8 to the left toward the existing pallet 3A. The pallet 3 held by the forks 8 comes in contact with the existing pallet 3A as illustrated in FIG. 4B. When the pallet 3 held by the forks 8 comes in contact with the existing pallet 3A, the pallet 3 moves to the right relative to the forks 8.

As illustrated in FIG. 4B, the pallet 3 held by the forks 8 is moving to the right relative to the forks 8 when all of the laser beams L emitted from the laser sensors 23A-23D are not reflected by the front surface 3*a* of the pallet 3 although the pallet 3 held by the forks 8 is in contact with the existing pallet 3A.

As illustrated in FIG. 4C, the pallet 3 held by the forks 8 has finished moving to the right relative to the forks 8 when the laser beams L emitted from the laser sensors 23A, 23C are reflected by the front surface 3*a* of the pallet 3.

Then, the side shift unit 28 stops moving the forks 8 to the left. The lift cylinder 9 lowers the forks 8 so that the pallet 3 held by the forks 8 is placed on the right side of the existing pallet 3A on the loading platform. The left side surface 3*c* of the pallet 3 comes in contact with the right side surface 3*c* of the existing pallet 3A.

In this embodiment, the side shift unit 28 begins to move the forks 8 toward the existing pallet 3A after the forks 8 are inserted into the fork holes 11 of the pallet 3. The movement of the pallet 3 with the forks 8 inserted in the fork holes 11 of the target pallet 3 is detected, and the contact of the pallet 3 with the existing pallet 3A is determined based on the detected movement of the pallet 3. If the side shift unit 28 stops moving the forks 8 toward the existing pallet 3A as soon as the pallet 3 held by the forks 8 comes in contact with the existing pallet 3A, so that the pallet 3 is prevented from pushing the existing pallet 3A excessively. This allows the pallet 3 to be placed beside the existing pallet 3A without a gap between the pallet 3 and the existing pallet 3A while preventing the pallet 3 from pushing the existing pallet 3A excessively. This therefore prevents a damage to the pallet 3 and the existing pallet 3A or a shifting of cargoes on the truck due to vibration of the truck.

In this embodiment, the pallet 3 moves relative to the forks 8 when the pallet 3 held by the forks 8 comes in contact with the existing pallet 3A with the movement of the forks 8 toward the existing pallet 3A by the side shift unit 28. When the reflections of the laser beams L linearly emitted from the laser sensors 23A-23D and reflected from the front surface 3*a* of the pallet 3 is detected, it is judged that the pallet 3 has moved relative to the forks 8, and it is therefore determined that the pallet 3 is in contact with the existing pallet 3A. This allows the contact of the pallet 3 with the existing pallet 3A to be accurately determined with the less expensive laser sensors 23A-23D.

Further in this embodiment, the movement of the forks 8 toward the existing pallet 3A is automatically stopped when it is determined that the pallet 3 is in contact with the existing pallet 3A. This further prevents the pallet 3 from pushing the existing pallet 3A excessively.

Figure 5:
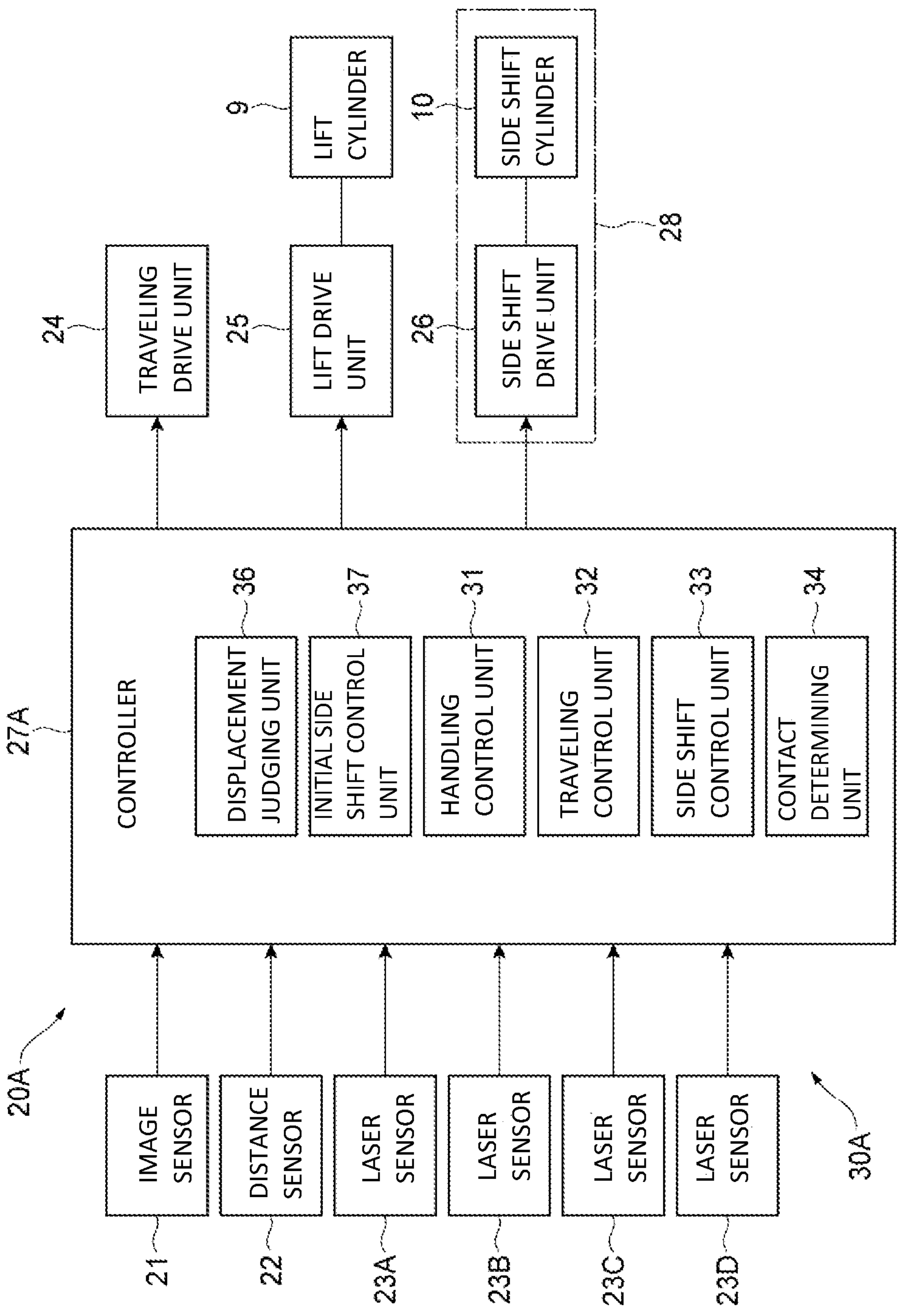
FIG. 5 is a schematic diagram of a loading control device provided with a side shift control device according to a second embodiment of the present disclosure.

FIG. 5 is a schematic diagram of a loading control device provided with a side shift control device according to a second embodiment of the present disclosure. As illustrated in FIG. 5, the loading control device 20 includes a controller 27A instead of the controller 27 according to the first embodiment.

The controller 27A includes a displacement judging unit 36 (judging unit), an initial side shift control unit 37, the handling control unit 31, the traveling control unit 32, the side shift control unit 33, and the contact determining unit 34.

With the forks 8 inserted into the fork holes 11 of the pallet 3, the displacement judging unit 36 judges, based on the detection data of the laser sensors 23A-23D, whether the forks 8 are in contact with or adjacent to the inner surfaces 3*d* of the pallet 3.

When the displacement judging unit 36 judges that the forks 8 are in contact with or adjacent to the inner surfaces 3*d* of the pallet 3, the initial side shift control unit 37 controls the side shift unit 28 so that the forks 8 move toward centers G of the fork holes 11 (see FIGS. 7A and 7B) in the right-left direction.

The laser sensors 23A-23D cooperate with the displacement judging unit 36, the initial side shift control unit 37, the side shift control unit 33, and the contact determining unit 34 of the controller 27A to form a side shift control device 30A of the present embodiment.

Figure 6:
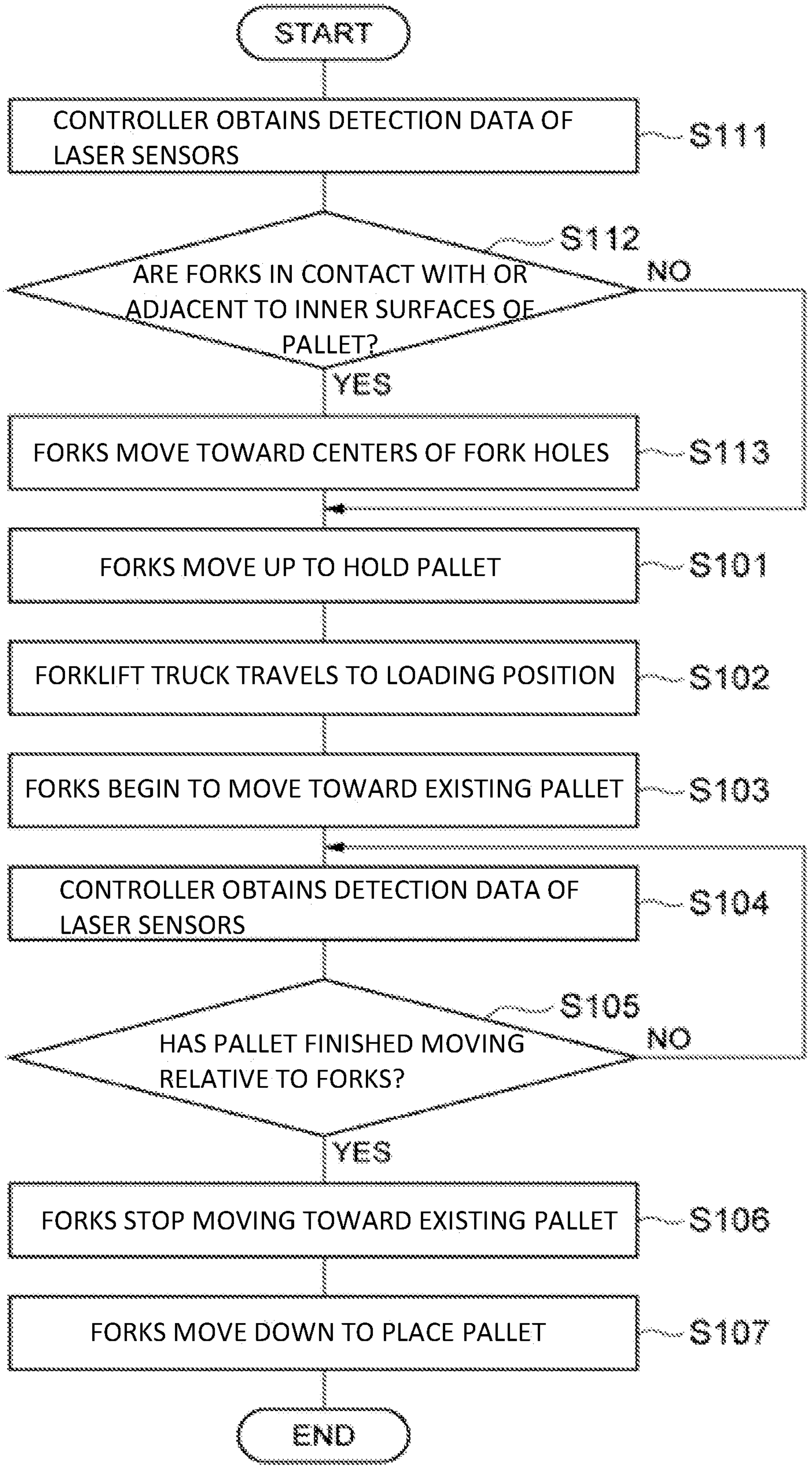
FIG. 6 is a flowchart of a control process performed by a controller illustrated in FIG. 5.

FIG. 6 is a flowchart of a control process performed by the controller 27A, and corresponds to FIG. 3.

As illustrated in FIG. 6, the controller 27A obtains the detection data of the laser sensors 23A-23D (step S111). The controller 27A judges, based on the detection data of the laser sensors 23A-23D, whether the forks 8 inserted into the fork holes 11 of the pallet 3 are in contact with or adjacent to the inner surfaces 3*d* of the pallet 3 (step S112).

Figure 7A:
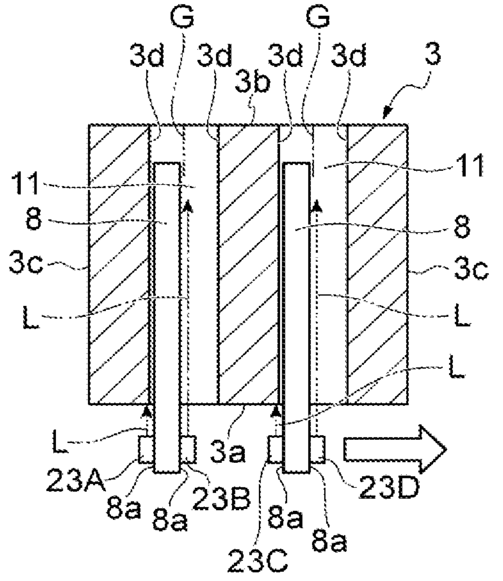
FIGS. 7A and 7B are sectional views depicting an operation performed by an initial side shift control unit illustrated in FIG. 5.

FIG. 7A illustrates a state of the forks 8 in contact with or adjacent to the inner surfaces 3*d* of the pallet 3. In this state, the laser sensors 23A-23D emit the laser beams L and the laser sensors 23A, 23C receive the reflections of the laser beams L emitted from the laser sensors 23A, 23C and reflected from the front surface 3*a* of the pallet 3 Alternatively, in this state, the laser sensors 23A-23D emit the laser beams L and the laser sensors 23B, 23D receive the reflections of the laser beams L emitted from the laser sensors 23B, 23D and reflected from the front surface 3*a* of the pallet 3. In a state where the forks 8 are adjacent to the inner surfaces 3*d* of the pallet 3, the distance between the side surface 8*a* of each fork 8 and its adjacent inner surface 3*d* of the pallet 3 in the proximate direction of the fork 8 is equal to or less than the predetermined distance.

In this embodiment, in a state where the forks 8 are in contact with or adjacent to the inner surfaces 3*d* of the pallet 3, the laser beams L emitted from the laser sensors 23A, 23C are reflected from the front surface 3*a* of the pallet 3, and the reflected laser beams L from the front surface 3*a* of the pallet 3 are received by the laser sensors 23A, 23C.

Figure 7B:
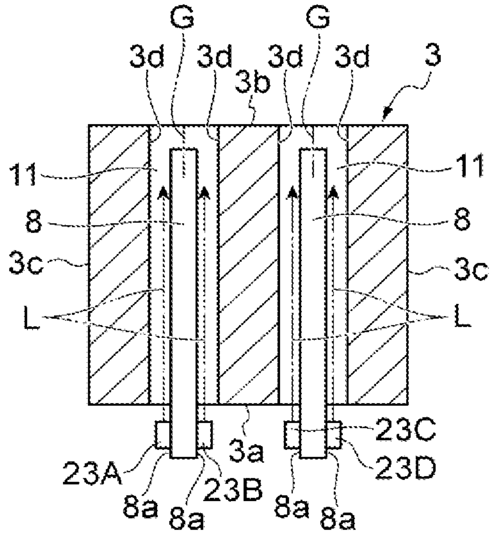

When the controller 27A judges that the forks 8 are in contact with or adjacent to the inner surfaces 3*d* of the pallet 3, the controller 27A controls the side shift drive unit 26 so that the forks 8 move toward the centers G of the fork holes 11 in the right-left direction (step S113). As illustrated in FIG. 7B, the controller 27A controls the side shift drive unit 26 so that the forks 8 move to a position where all of the laser beams L emitted from the laser sensors 23A-23D are not reflected by the front surface 3*a* of the pallet 3.

The controller 27A performs steps S101 to S107. When the controller 27A judges that the forks 8 are not in contact with or adjacent to the inner surfaces 3*d* of the pallet 3, the controller 27A performs steps S101 to S107 without performing step S113.

Step S111 and step S112 are performed by the displacement judging unit 36. Step S113 is performed by the initial side shift control unit 37.

In this embodiment, the forks 8 once move toward the centers G of the fork holes 11 in the right-left direction, when the forks 8 are in contact with or adjacent to the inner surfaces 3*d* of the pallet 3 with the forks 8 inserted into the fork holes 11 of the pallet 3. Then, the forks 8 begin to move toward the existing pallet 3A, so that the pallet 3 reliably comes in contact with the existing pallet 3A.

Figure 8:
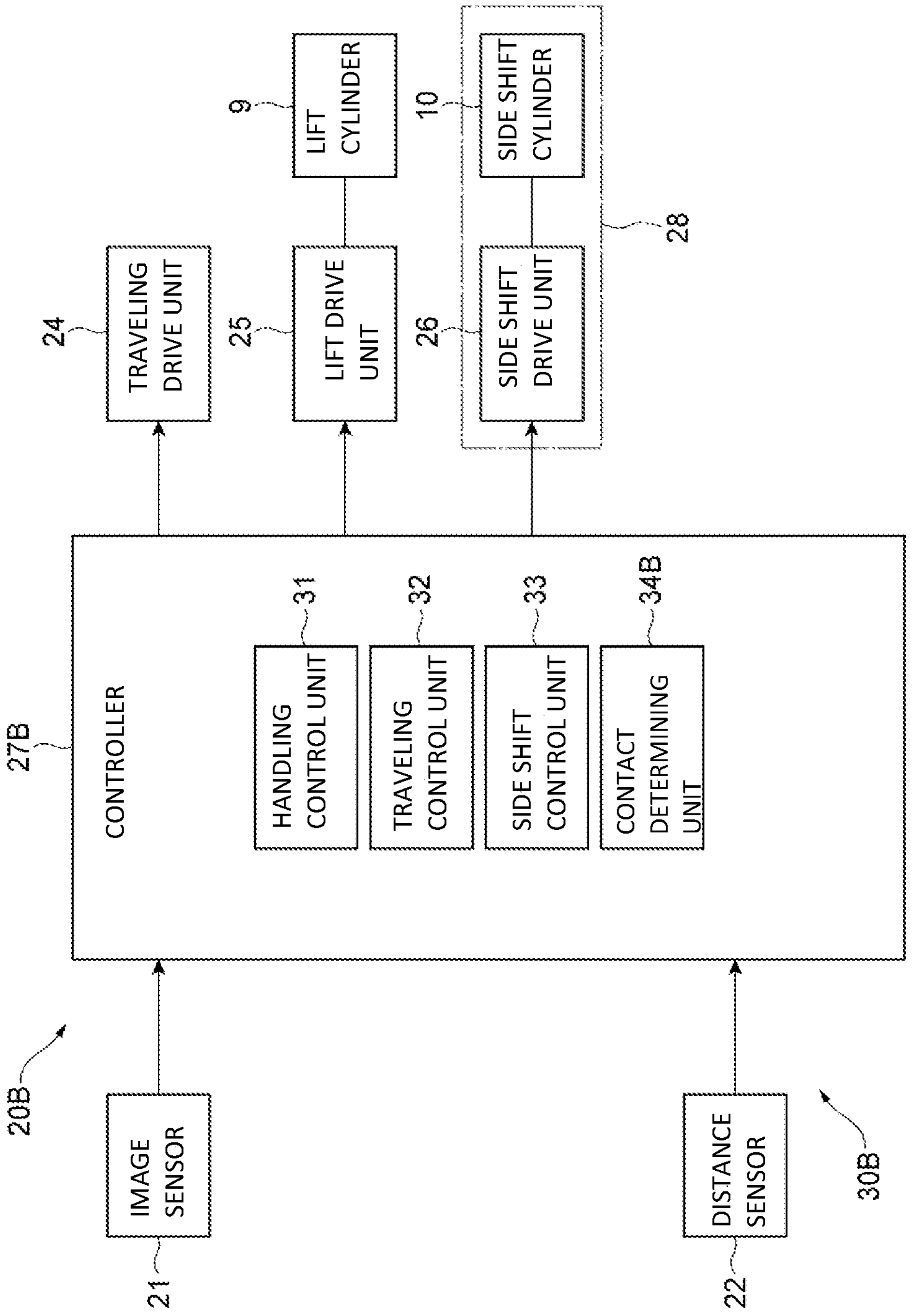
FIG. 8 is a schematic diagram of a loading control device provided with a side shift control device according to a third embodiment of the present disclosure.

FIG. 8 is a schematic diagram of a loading control device provided with a side shift control device according to a third embodiment of the present disclosure. As illustrated in FIG. 8, a loading control device 20B does not include the laser sensors 23A-23D according to the first embodiment. In this embodiment, the image sensor 21 and the distance sensor 22 cooperate to serve as the detecting unit of the present disclosure that is configured to detect a movement of the pallet 3 in a situation where the forks 8 are in the fork holes 11 of the target pallet 3.

The loading control device 20B includes a controller 27B instead of the controller 27 according to the first embodiment. The controller 27B includes the handling control unit 31, the traveling control unit 32, the side shift control unit 33, and a contact determining unit 34B (determining unit).

The contact determining unit 34B is configured to determine, based on the movement of the pallet 3 detected by the image sensor 21 and the distance sensor 22, whether the pallet 3 held by the forks 8 is in contact with the existing pallet 3A.

The contact determining unit 34B judges, based on the image data of the image sensor 21 and the measurement data of the distance sensor 22, whether the pallet 3 has begun to displace relative to the forks 8, and determines that the pallet 3 held by the forks 8 is in contact with the existing pallet 3A when the contact determining unit 34B judges that the pallet 3 has begun to displace relative to the forks 8.

The image sensor 21 and the distance sensor 22 cooperate with the side shift control unit 33 and the contact determining unit 34B of the controller 27B to form a side shift control device 30B of the present embodiment.

Figure 9:
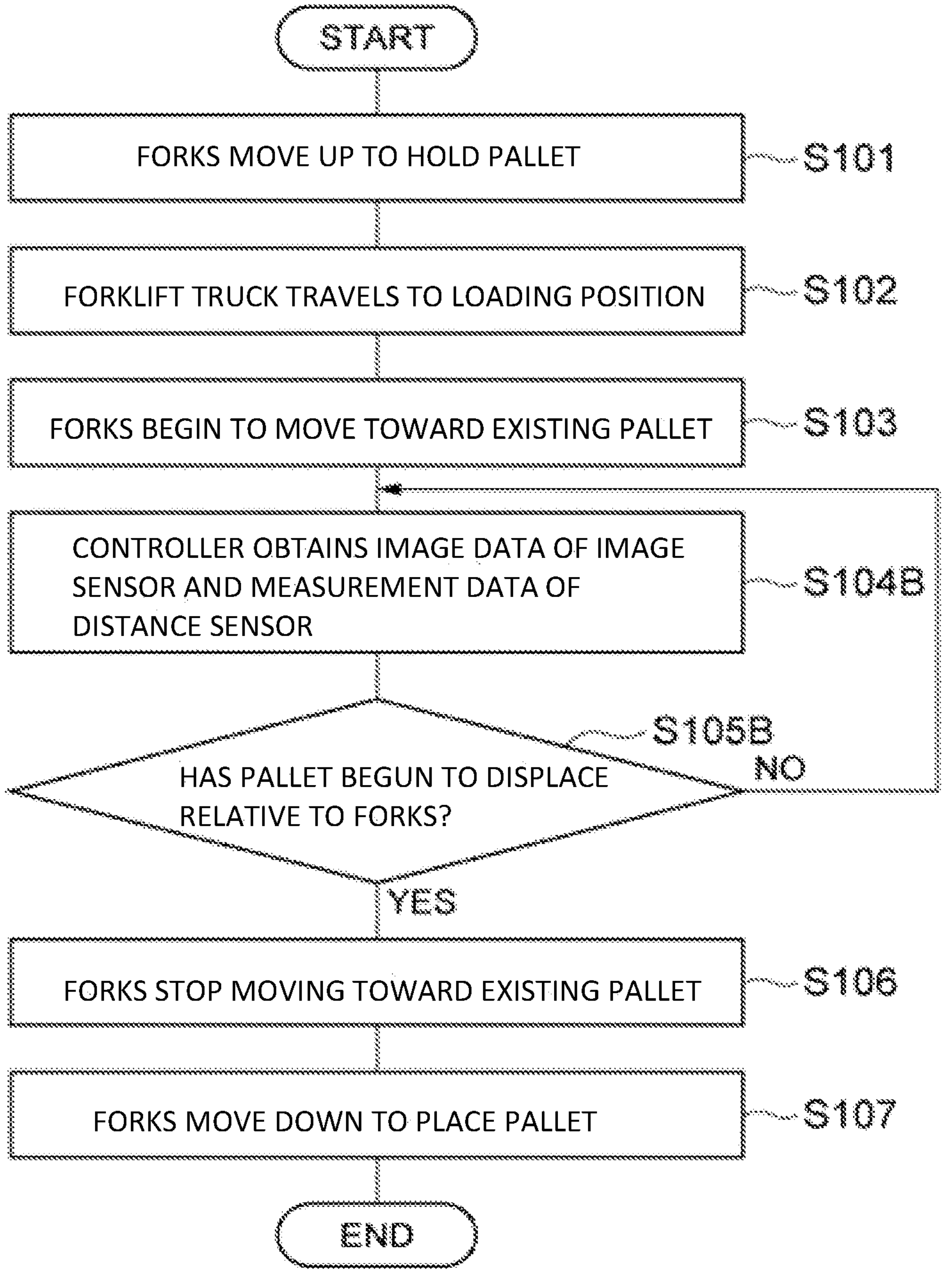
FIG. 9 is a flowchart of a control process performed by a controller illustrated in FIG. 8.

FIG. 9 is a flowchart of a control process performed by the controller 27B, and corresponds to FIG. 3.

As illustrated in FIG. 9, the controller 27B obtains the image data of the image sensor 21 and the measurement data of the distance sensor 22 after performing step S101 to step S103 (step S104B). The controller 27B judges, based on the image data of the image sensor 21 and the measurement data of the distance sensor 22, whether the pallet 3 has begun to displace relative to the forks 8 (step S105B).

In this judgement of the displacement of the pallet 3 relative to the forks 8, the displacement of the pallet 3 or a cargo on the pallet 3 is detected by comparing the latest image data of the image sensor 21 with the previously obtained image data of the image sensor 21.

If LIDAR is used as the distance sensor 22 in this judgement of the displacement of the pallet 3 relative to the forks 8, the displacement of the pallet 3 or the cargo on the pallet 3 is detected based on the position of the pallet 3 or the cargo on the pallet 3 determined by the distance sensor 22.

The pallet 3 held by the forks 8 is not moved any further toward the existing pallet 3A in a situation where the pallet 3 held by the forks 8 is in contact with the existing pallet 3A. Accordingly, the pallet 3 moves relative to the forks 8 in the right-left direction, so that the pallet 3 begins to displace relative to the forks 8. When the pallet 3 has not begun to displace relative to the forks 8, it is determined that the pallet 3 held by the forks 8 is not in contact with the existing pallet 3A. When the pallet 3 has begun to displace relative to the forks 8, it is determined that the pallet 3 held by the forks 8 is in contact with the existing pallet 3A.

When the controller 27B judges that the pallet 3 has not begun to displace relative to the forks 8, the controller 27B performs step S104B again. When the controller 27B judges that the pallet 3 has begun to displace relative to the forks 8, the controller 27B performs step S106 and step S107.

Specifically, step S104B and step S105B are performed by the contact determining unit 34B.

According to this embodiment, as in the first embodiment, the movement of the forks 8 toward the existing pallet 3A is stopped as soon as the pallet 3 held by the forks 8 comes in contact with the existing pallet 3A to prevent the pallet 3 from pushing the existing pallet 3A excessively. This allows the pallet 3 to be placed beside the existing pallet 3A without a gap between the pallet 3 and the existing pallet 3A while preventing the pallet 3 from pushing the existing pallet 3A excessively.

In this embodiment, the pallet 3 displaces relative to the forks 8 when the pallet 3 held by the forks 8 comes in contact with the existing pallet 3A with the movement of the forks 8 toward the existing pallet 3A by the side shift unit 28. When it is judged by using the image sensor 21 and the distance sensor 22 that the pallet 3 has begun to displace relative to the forks 8, it is determined that the pallet 3 is in contact with the existing pallet 3A. The forklift truck 1 may include the image sensor 21 and the distance sensor 22. This configuration reduces the number of parts of the side shift control device, and therefore reduces the cost, such as expenses for mounting and maintaining the image sensor 21 and the distance sensor 22.

The present disclosure is not limited to the above-described embodiments. For example, according to the first embodiment and the second embodiment, the laser sensors 23A, 23B are respectively fixed to the left and right side surfaces 8*a* of one of the forks 8 at the proximal portion of the one fork 8, and the laser sensors 23C, 23D are respectively fixed to the left and right side surfaces 8*a* of the other of the forks 8 at the proximal portion of the other fork 8. However, the present disclosure is not limited thereto.

For example, depending on the size and/or the position of the fork holes 11, the laser beams L emitted from the laser sensors 23A, 23C respectively fixed to the left side surfaces 8*a* of the forks 8 may not be reflected by the front surface 3*a* of the pallet 3, or the laser beams L emitted from the laser sensors 23B, 23D fixed to the right side surfaces 8*a* of the forks 8 may not be reflected by the front surface 3*a* of the pallet 3.

Figure 10A:
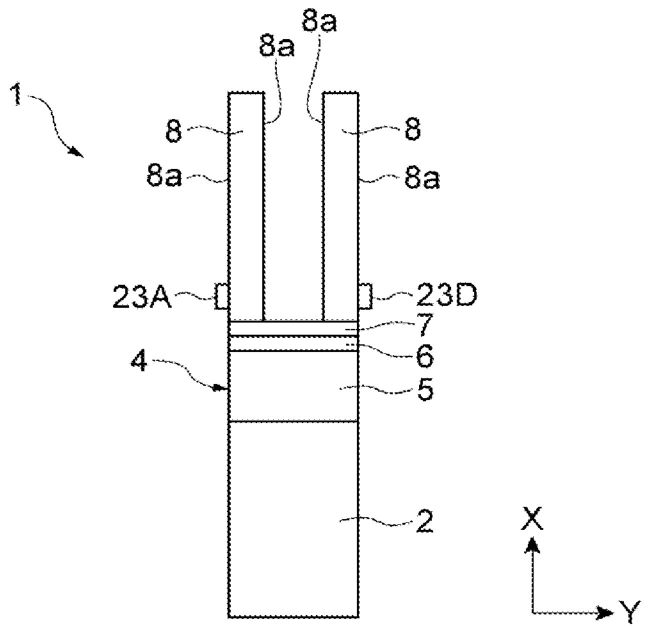
FIGS. 10A and 10B are schematic plane views of a modification of the forklift truck illustrated in FIG. 1, illustrating the forklift truck with a pallet.

Accordingly, as illustrated in FIG. 10A, the laser sensor 23A and the laser sensor 23D may be respectively fixed to the left side surface 8*a* of the left fork 8 at the proximal portion of the left fork 8 and the right side surface 8*a* of the right fork 8 at the proximal portion of the right fork 8. That is, the forks 8 may only have at the proximal portions of the forks 8, the laser sensors 23A, 23D that are fixed to the outer-side surfaces of the forks 8 in the right-left direction.

Figure 10B:
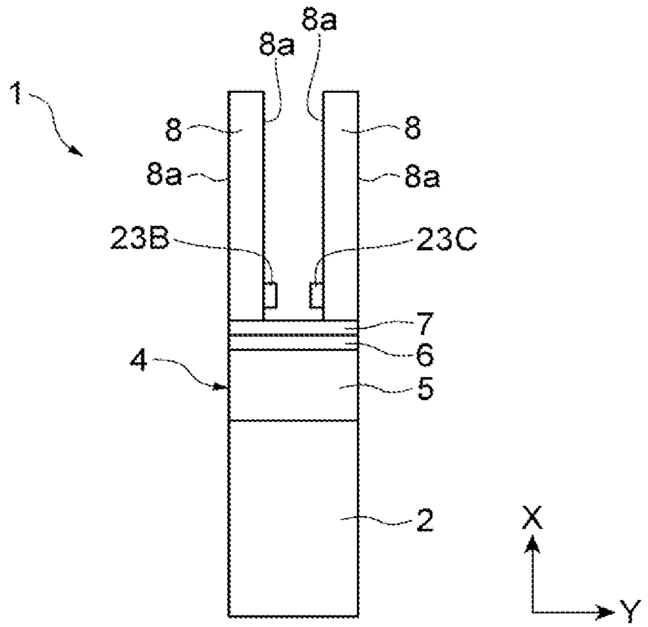

Alternatively, as illustrated in FIG. 10B, the laser sensor 23B and the laser sensor 23C may be respectively fixed to the right side surface 8*a* of the left fork 8 at the proximal portion of the left fork 8 and the left side surface 8*a* of the right fork 8 at the proximal portion of the right fork 8. That is, the forks 8 may only have at the proximal portions of the forks 8, the laser sensors 23B, 23C that are fixed only to the inner-side surfaces of the forks 8 in the right-left direction.

According to the first embodiment and the second embodiment, it is judged, based on the detection data of the laser sensors 23A-23D, whether the pallet 3 held by the forks 8 has finished moving relative to the forks 8. However, the present disclosure is not limited thereto. For example, the laser sensors 23A, 23C or the laser sensors 23B, 23D may receive the reflected laser beams L from the front surface 3*a* of the pallet 3 (see FIG. 7A) depending on the mounting positions of the laser sensors 23A-23D, even in a state where the forks 8 in the fork holes 11 are located away from the inner surfaces 3*d* of the pallet 3. Accordingly, the judgement as to whether the pallet 3 held by the forks 8 has moved relative to the forks 8 may be made based on the detection data of the laser sensors 23A-23D.

According to the third embodiment, it is judged, based on the image data of the image sensor 21 and the measurement data of the distance sensor 22, whether the pallet 3 has begun to displace relative to the forks 8. However, the present disclosure is not limited thereto. For example, the judgement as to whether the pallet 3 has begun to displace relative to the forks 8 may be made only based on the image data of the image sensor 21, or may be made only based on the measurement data of the distance sensor 22.

Furthermore, the image sensor 21 and the distance sensor 22 may be replaced with Time-of-Flight Camera (ToF camera) or the like. The side shift control device according to the third embodiment may be combined with the side shift control device according to the second embodiment.

According to the embodiments, the side shift unit 28 moves the forks 8 in the right-left direction so that the pallet 3 comes in contact with the existing pallet 3A when the pallet 3 held by the forks 8 is placed beside the existing pallet 3A. However, the present disclosure is not limited thereto. For example, the side shift unit 28 may move the forks 8 in the right-left direction so that the pallet 3 comes in contact with a side wall of the loading platform when the pallet 3 held by the forks 8 is placed beside the side wall. In this situation, the side wall of the loading platform serves as the object with which the pallet 3 comes in contact.

According to the embodiments, the pallet 3 is automatically placed beside the object by an automatic operation. However, the present disclosure is applicable to a case where the pallet 3 is manually placed beside the object by a manual operation by the driver of the forklift truck 1. In this case, when it is determined that the pallet 3 comes in contact with the object, the driver may be alerted by an alarm or the like or the side shift unit 28 may emergently stop moving the forks 8 toward the object.

According to the embodiments, the side shift unit 28 is controlled so that the forks 8 holding the pallet 3 moves toward the object to load a cargo, but the present disclosure is not limited thereto. The present disclosure is applicable to any cases as long as the side shift unit 28 moves the pair of forks 8 in the right-left direction so that the pallet 3 comes in contact with the object.

What is claimed is:

1. A side shift control device for a forklift truck, the side shift control device configured to cause a side shift unit to move a pair of forks holding a pallet in a right-left direction so that the pallet comes in contact with an object when the pallet is placed beside the object, the side shift control device comprising:

a side shift control unit configured to control the side shift unit so that the pair of forks begin to move toward the object after the pair of forks are inserted into a pair of fork holes formed in the pallet;

a detecting unit configured to detect a movement of the pallet relative to the forks with the forks inserted in the fork holes; and a determining unit configured to determine, based on the movement of the pallet detected by the detecting unit, whether the pallet is in contact with the object, wherein the detecting unit is formed of laser sensors, wherein the laser sensors are fixed to at least one of outer-side surfaces of the forks or inner-side surfaces of the forks in the right-left direction at proximal portions of the forks, and configured to irradiate the pallet with straight laser beams and detect reflections of the laser beams from a front surface of the pallet, and wherein the determining unit judges, based on detection data of the laser sensors, whether the pallet has moved relative to the forks, and determines that the pallet is in contact with the object when the determining unit judges that the pallet has moved relative to the forks.

2. The side shift control device for the forklift truck according to claim 1, wherein the side shift control device further comprises:

a judging unit configured to judge, based on the movement of the pallet detected by the detecting unit, whether the forks are in contact with or adjacent to inner wall surfaces of the pallet forming the fork holes; and an initial side shift control unit configured to control the side shift unit so that the forks move toward centers of the fork holes in the right-left direction, when the judging unit judges that the forks are in contact with or adjacent to the inner wall surfaces of the pallet, and the side shift control unit is configured to control the side shift unit so that the forks begin to move toward the object after the initial side shift control unit controls the side shift unit so that the forks move toward the centers of the fork holes in the right-left direction.

3. The side shift control device for the forklift truck according to claim 1, wherein the side shift control unit is configured to control the side shift unit so that the forks stop moving toward the object when the determining unit determines that the pallet is in contact with the object.

* * * * *